US008052530B2

(12) United States Patent
Onuki et al.

(10) Patent No.: US 8,052,530 B2
(45) Date of Patent: Nov. 8, 2011

(54) NETWORK GAME SYSTEM, GAME MACHINE, GAME MACHINE CONTROL METHOD, AND INFORMATION STORAGE MEDIUM

(75) Inventors: Katsunori Onuki, Minato-ku (JP); Ken Goto, Minato-ku (JP); Shin Tsuchiya, Minato-ku (JP); Toshikazu Munemasa, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 794 days.

(21) Appl. No.: 12/091,911

(22) PCT Filed: Sep. 13, 2006

(86) PCT No.: PCT/JP2006/318175
§ 371 (c)(1),
(2), (4) Date: Apr. 28, 2008

(87) PCT Pub. No.: WO2007/049407
PCT Pub. Date: May 3, 2007

(65) Prior Publication Data
US 2009/0124388 A1 May 14, 2009

(30) Foreign Application Priority Data
Oct. 27, 2005 (JP) .................................. 2005-312499

(51) Int. Cl.
*A63F 9/24* (2006.01)
(52) U.S. Cl. .................... 463/42; 463/4; 463/40; 463/43
(58) Field of Classification Search ................ 463/4, 35, 463/40, 42, 43
See application file for complete search history.

(56) References Cited

U.S. PATENT DOCUMENTS
2002/0035604 A1 3/2002 Cohen et al.
(Continued)

FOREIGN PATENT DOCUMENTS
JP 2000-279644 A 10/2000
JP 2001-149658 A 6/2001
JP 2003-117248 A 4/2003
(Continued)

OTHER PUBLICATIONS
Extended Search Report dated Oct. 20, 2008.

*Primary Examiner* — Dmitry Suhol
*Assistant Examiner* — Brandon Gray
(74) *Attorney, Agent, or Firm* — Sughrue Mion, PLLC

(57) ABSTRACT

To provide a network game system for switching a server-client machine without deteriorating the excitement of a game. A network game system (10) causes each of a plurality of game machines (12) to operate as a client and at least one of the plurality of game machines (12) to also operate as a server, thereby providing a game to be played by the players of the plurality of game machines (12). A game play evaluation value calculation unit (40) calculates a play evaluation value corresponding to each of the plurality of game machines (12) during a game. In the case where a predetermined switching determination time arrives during the game, a server switching unit (52) switches the game machine (12) operating as the server from the game machine (12) currently operating as the server to another game machine (12) of the plurality of game machines (12), based on the evaluation value calculated by the play evaluation value calculation unit (40).

7 Claims, 7 Drawing Sheets

U.S. PATENT DOCUMENTS

| | | | |
|---|---|---|---|
| 2002/0147047 A1* | 10/2002 | Letovsky et al. | 463/42 |
| 2002/0161821 A1 | 10/2002 | Narayan et al. | |
| 2002/0165630 A1* | 11/2002 | Arthur et al. | 700/91 |
| 2003/0104868 A1 | 6/2003 | Okita et al. | |
| 2004/0063479 A1* | 4/2004 | Kimura | 463/4 |
| 2004/0166914 A1 | 8/2004 | Ishihata et al. | |
| 2005/0181872 A1* | 8/2005 | Acharya et al. | 463/35 |
| 2006/0079329 A1 | 4/2006 | Yamada et al. | |
| 2006/0199644 A1 | 9/2006 | Hirota | |
| 2008/0300046 A1* | 12/2008 | Gagner et al. | 463/25 |

FOREIGN PATENT DOCUMENTS

| | | |
|---|---|---|
| JP | 2003-225469 A | 8/2003 |
| JP | 2003-265861 A | 9/2003 |
| JP | 2004-174091 A | 6/2004 |
| JP | 2004-344353 A | 12/2004 |
| JP | 2004-350910 A | 12/2004 |
| JP | 2005-204948 A | 8/2005 |
| JP | 2005-318934 A | 11/2005 |
| TW | 1222379 B | 10/2004 |
| WO | 02/47780 A1 | 6/2002 |

* cited by examiner

FIG.5

| PLAYER ID | GEME MACHINE ID | PLAY EVALUATION VALUE |
|---|---|---|
| P 1 | D 1 | 3 0 |
| P 2 | D 2 | 2 2 |

FIG.6

| PLAY TYPE | EVALUATION VALUE |
|---|---|
| DRIBBLE | 1 |
| PASS | 2 |
| SHOOT | 5 |
| FOUL | − 2 |

NETWORK GAME SYSTEM, GAME MACHINE, GAME MACHINE CONTROL METHOD, AND INFORMATION STORAGE MEDIUM

CROSS REFERENCE TO RELATED APPLICATIONS

This application is a National Stage of International Application No. PCT/JP2006/318175 filed on Sep. 13, 2006, claiming priority based on Japanese Patent Application No. 2005-312499, filed Oct. 27, 2005, the contents of all of which are incorporated herein by reference in their entirety.

TECHNICAL FIELD

The present invention relates to a network game system, a game machine, a game machine control method, and an information storage medium.

BACKGROUND ART

A network game system which comprises a plurality of game machines each having a server function and a client function, in which the respective game machines operate as clients and at least one game machine also operates as a server, thereby providing a game to be played by the players of a plurality of game machines, is available (for example, in paragraph 0154 of Patent Document 1). For example, in a known network game system, a soccer game is played by the players of two game machines, in which one of the two game machines operating as a client also operates as a server, or a server-client machine, and the other operates solely as a client, or a client-dedicated machine.

Patent Document 1: Japanese Patent Laid-open Publication No. 2003-225469

In this network game system, the client-dedicated machine executes the game while exchanging data with the server-client machine via a communication network, which causes the client-dedicated machine to have an inferior response capacity in game operation, compared to the server-client machine. Consequently, the player of the client-dedicated machine is forced to play the game in a disadvantageous situation compared to the player of the server-client machine. The network game system providing the soccer game as described above addresses this problem by assigning the role of a server to a different game machine between the first and second halves of the game.

DISCLOSURE OF THE INVENTION

Problems to be Solved by the Invention

However, a network game system providing a soccer game as described above, for example, in which the server-client machine is switched regardless of the content of the match, may lower the excitement of the game.

The present invention has been conceived in view of the above, and aims to provide a network game system, a game machine, a game machine control method, and an information storage medium for switching the server-client machine from the game machine currently operating as a server-client machine to another game machine while avoiding reduction in the excitement of a game.

Means for Solving the Problem

According to one aspect of the present invention, there is provided a network game system including a plurality of game machines each having a server function and a client function, in which each of the plurality of game machines operates as a client and at least one of the plurality of game machines also operates as a server, thereby providing a game to be played by players of the plurality of game machines, comprising play evaluation value calculating means for calculating a play evaluation value corresponding to each of at least one of the plurality of game machines during the game; switching determination time monitoring means for monitoring to see whether or not a predetermined switching determination time arrives; and server switching means for switching a game machine operating as the server from a game machine currently operating as the server to another game machine of the plurality of game machines, based on the play evaluation value calculated by the play evaluation value calculating means, in the event that the switching determination time arrives.

According to another aspect of the present invention, there is provided a game machine included in a network game system including a plurality of game machines each having a server function and a client function, in which each of the plurality of game machines operates as a client and at least one of the plurality of game machines also operates as a server, thereby providing a game to be played by players of the plurality of game machines, comprising play evaluation value calculating means for calculating a play evaluation value corresponding to each of at least one of the plurality of game machines during the game; switching determination time monitoring means for monitoring to see whether or not a predetermined switching determination time arrives; and server switching means for switching a game machine operating as the server from a game machine currently operating as the server to another game machine of the plurality of game machines, based on the play evaluation value calculated by the play evaluation value calculating means, in the event that the switching determination time arrives.

According to another aspect of the present invention, there is provided a method for controlling a game machine included in a network game system including a plurality of game machines each having a server function and a client function, in which each of the plurality of game machines operates as a client and at least one of the plurality of game machines also operates as a server, thereby providing a game to be played by players of the plurality of game machines, comprising a play evaluation value calculating step of calculating a play evaluation value corresponding to each of at least one of the plurality of game machines during the game; a switching determination time monitoring step of monitoring to see whether or not a predetermined switching determination time arrives; and a server switching step of switching a game machine operating as the server from a game machine currently operating as the server to another game machine of the plurality of game machines, based on the play evaluation value calculated at the play evaluation value calculating step, in the event that the switching determination time arrives.

According to another aspect of the present invention, there is provided a program for causing a computer, including, for example, a personal computer, a home-use game machine, a portable game machine, a commercial game machine, a portable telephone, a personal digital assistant, and so forth, to function as a game machine included in a network game system including a plurality of game machines each having a server function and a client function, in which each of the plurality of game machines operates as a client and at least one of the plurality of game machines also operates as a server, thereby providing a game to be played by players of the plurality of game machines, the computer functioning as play evaluation value calculating means for calculating a play evaluation value corresponding to each of at least one of the plurality of game machines during the game; switching determination time monitoring means for monitoring to see whether or not a predetermined switching determination time arrives; and server switching means for switching a game machine operating as the server from a game machine currently operating as the server to another game machine of the plurality of game machines, based on the play evaluation value calculated at the play evaluation value calculating means, in the event that the switching determination time arrives.

The information storage medium according to the present invention may be a computer readable information storage medium recording the above-described program. The program distribution device according to the present invention may comprise an information storage medium recording the above-described program, then reading the above-described program from the information storage medium, and distributing the program. The program distribution method according to the present invention is a method, while using an information storage medium recording the above-described program, for reading the above-described program from the information storage medium and distributing the program.

The present invention relates to a network game system including a plurality of game machines each having a server function and a client function, in which each of the plurality of game machines operates as a client and at least one of the plurality of game machines also operates as a server, thereby providing a game to be played by players of the plurality of game machines. According to the present invention, a play evaluation value corresponding to each of at least one of the plurality of game machines is calculated during the game. Then, whether or not a predetermined switching determination time arrives is monitored. In the event that the switching determination time arrives, a game machine operating as the server is switched from a game machine currently operating as the server to another game machine of the plurality of game machines, based on the calculated play evaluation value. According to the present invention, the server-client machine is switched based on a play evaluation value of each game machine, which is calculated during the game. This makes it possible to switch the server-client machine while considering the game situation, thus avoiding reduction in the excitement of a game.

In one embodiment of the present invention, the play evaluation value calculating means may include play evaluation value storage means for storing the play evaluation value so as to correspond to the game machine, play type storage means for storing an evaluation value so as to correspond to each of one or a plurality of play types, and play evaluation value update means for updating, in the case where a play corresponding to any play type is carried out by a player associated with the game machine, the play evaluation value stored in the play evaluation value storage means so as to correspond to that game machine, based on the evaluation value stored in the play type storage means so as to correspond to that play type.

In one embodiment of the present invention, the play evaluation value calculating means may calculate a play evaluation value corresponding to each of the plurality of game machines, and the server switching means may switch the game machine operating as the server from the game machine currently operating as the server to a game machine presenting a highest play evaluation value calculated by the play evaluation value calculating means among the plurality of game machines.

BRIEF DESCRIPTION OF THE DRAWINGS

FIG. 5 is a diagram showing one example of a play evaluation value table;

FIG. 6 is a diagram showing one example of a play type table;

BEST MODE FOR CARRYING OUT THE INVENTION

In the following, one example of an embodiment of the present invention will be described in detail with reference to the accompanying drawings.

Figure 1:
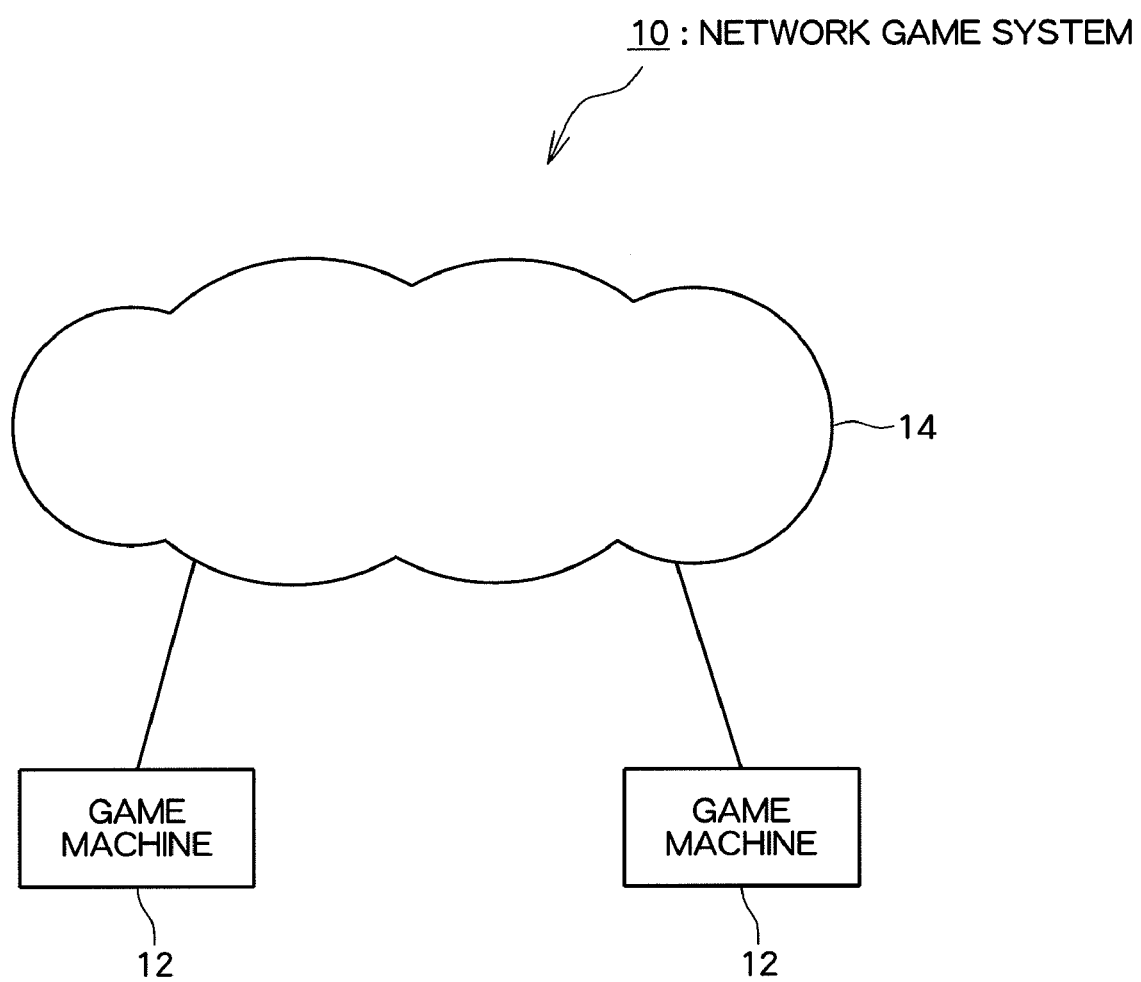
FIG. 1 is a diagram showing an overall structure of a network game system according to this embodiment.

FIG. 1 is a diagram showing an overall structure of a network game system according to an embodiment of the present invention. As shown, the network game system 10 comprises a plurality of game machines 12, each connected to a communication network 14, such as the Internet or the like, and capable of exchanging data among one another.

The game machine 12 is a computer system comprising, for example, a microprocessor, a main memory, a hard disk device, a disk reading device, a communication interface, an operating unit, an image processing unit, a monitor, and so forth. The operating unit is a game controller, a mouse, or the like, for example. The disk reading device is a device for reading content stored in an optical disc (information storage medium), such as a DVD-ROM, or the like, for example. The communication interface is an interface for connection between the game machine 12 and the communication network 14. The image processing unit includes a VRAM and renders a game screen image in the VRAM based on the image data sent from the microprocessor. The image processing unit converts the content of the VRAM into a video signal, and outputs at a predetermined timing to the monitor. The game machine 12 is formed using a publicly known conventional home-use game machine, portable game machine, personal digital assistant, portable phone, personal computer, or the like, for example.

In the thus structured network game system 10, each game machine 12 stores information about a common game situation (game situation information) in the main memory thereof, and the common game situation is updated according to an operation carried out in each game machine 12. Further, a game screen showing a common game situation is displayed on the monitor of each game machine 12. As described above, the network game system 10 realizes a network game participated in by a plurality of players via the communication network 14.

In the network game system 10, each game machine 12 has a server function and a client function. The server function refers to a function for sharing game situation held in each game machine 12 among respective game machines 12, and includes, for example, (a) a function for managing game situation information to be used as a reference (original game situation information), (b) a function for updating original game situation information based on the content of an operation carried out in each game machine 12, and (c) a function for reflecting the updated content in game situation information held by another game machine 12 (sub-game situation information). The client function includes, for example, (a) a function for supplying the content of an operation carried out by a player to a server function and (b) a function for updating the game screen image based on the game situation updated by the server function.

In the network game system 10, the respective game machines 12 operate as clients, and at least one game machine 12 also operates as a server. In other words, in the network game system 10, various information (for example, operation information, game situation update information, and so forth) is exchanged between the server function of at least one game machine 12 and the client functions of the respective game machines 12, whereby the above-described network game is realized.

It should be noted that, in the following, a situation in which a game machine 12 operates as a client and also a server is referred to as a server-client state, and a game machine 12 in a server-client state is referred to as a server-client machine. A state in which a game machine 12 operates as a client but not as a server is referred to as a client-dedicated state, and a game machine 12 in a client-dedicated state is referred to as a client-dedicated machine.

In the following, the network game system 10 provides a soccer game match to be played by the players of two game machines 12. In the main memory of each game machine 12, a common game space in which players belonging to the respective teams, a ball, and so forth are placed, is created. A game screen image showing the situation held in the common game space is shown on the monitors of the respective game machines 12.

In the network game system 10, a server-client machine is switched from one game machine 12 to another game machine 12 during a game. In the following, a technique for achieving the switching of the server-client machine while avoiding deterioration of the excitement of the game will be described.

Figure 2:
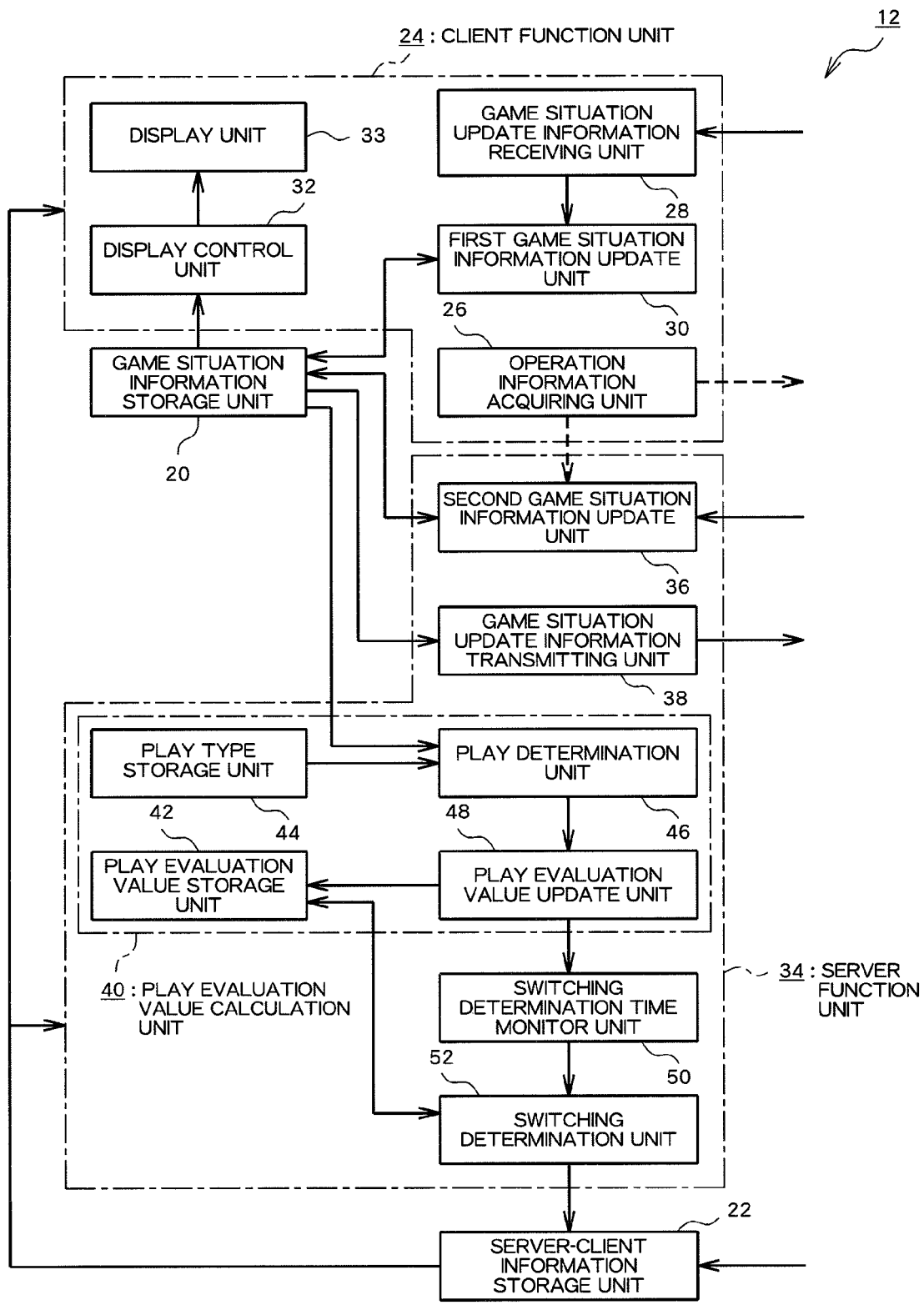
FIG. 2 is a functional block diagram of a game machine contained in the network game system according to this embodiment.

FIG. 2 is a functional block diagram showing functions according to the present invention among those realized in each game machine 12. As shown, each game machine 12 comprises a game situation information storage unit 20, a server-client information storage unit 22, a client function unit 24, and a server function unit 34. These functions are realized in each game machine 12 by carrying out a game program provided being stored in an information storage medium, such as a DVD-ROM or the like, or via the communication network 14, such as the Internet or the like.

Figure 3:
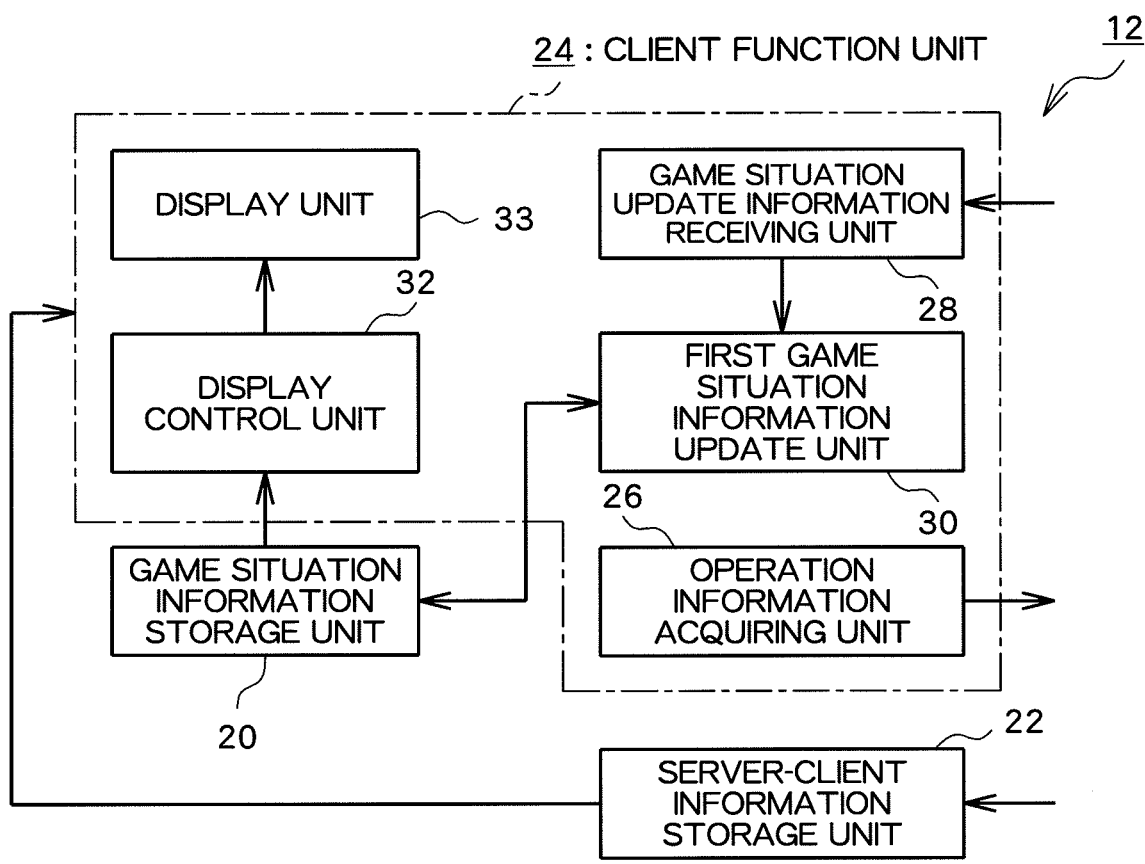
FIG. 3 is a functional block diagram of a client-dedicated machine.
Figure 4:
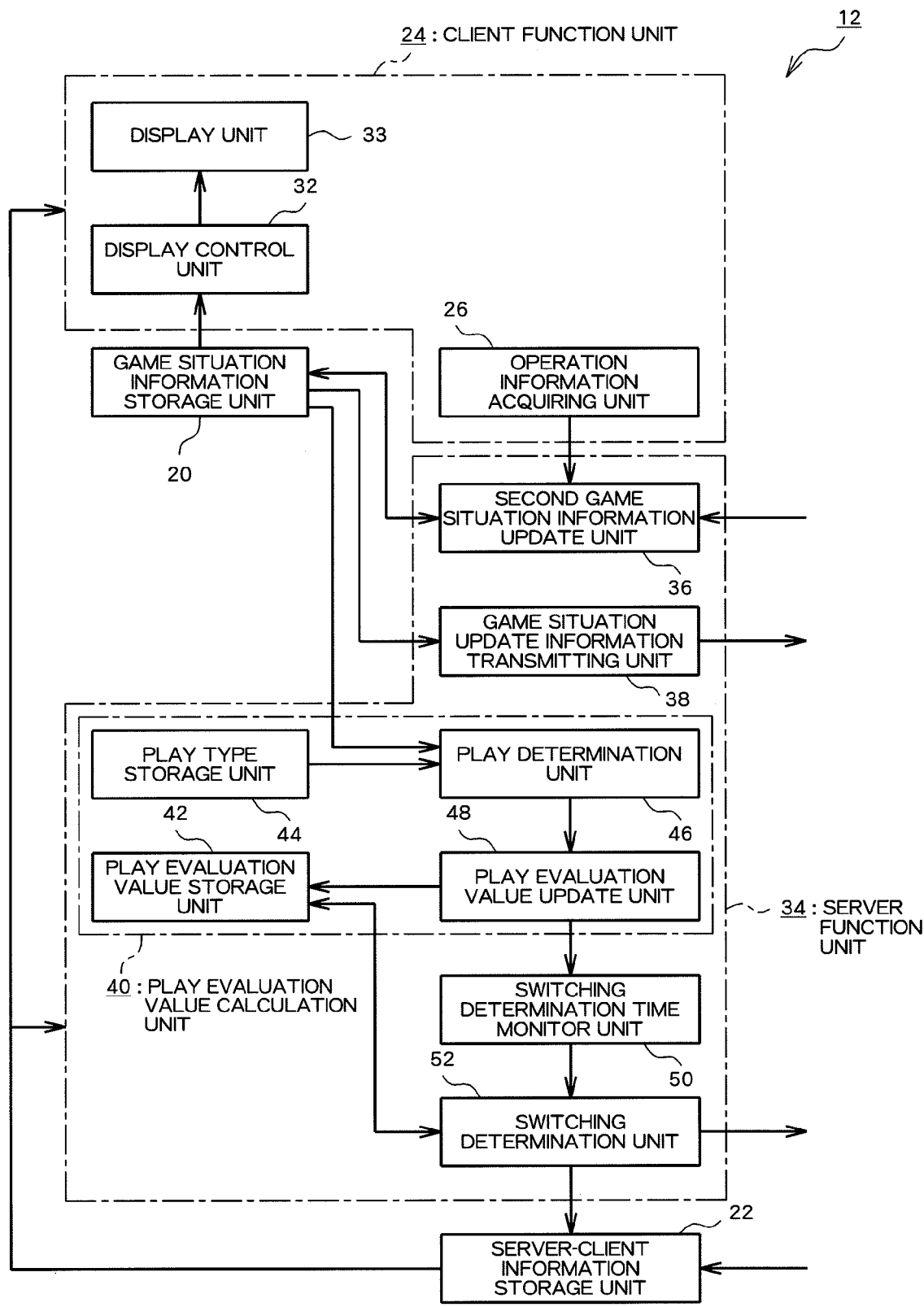
FIG. 4 is a functional block diagram of a server-client machine.

FIG. 3 shows a function realized by the game machine 12 in a client-dedicated state among those shown in FIG. 2. That is, FIG. 3 is a functional block diagram of a client-dedicated machine. FIG. 4 shows a function realized by the game machine 12 in a server-client state among those shown in FIG. 2. That is, FIG. 4 is a functional block diagram of a server-client machine.

[Game Situation Information Storage Unit]

The game situation information storage unit 20 is realized using the main memory of the game machine 12 as a main component. The game situation information storage unit 20 stores game situation information about a game situation. In this embodiment, the game situation information describes, for example, the state (position, posture, moving direction, moving speed, movement type, such as dribble, pass, shoot, and so forth, and so forth) of each player character placed in the game space, and the state (position, moving direction, moving speed, and so forth) of the ball. The game situation information may also describe a game situation, such as scores of the respective teams, a period of time elapsed, and so forth.

[Server-client Information Storage Unit]

The server-client information storage unit 22 is realized using the main memory of the game machine 12 as a main component. In this embodiment, the server-client information storage unit 22 stores a server-client state flag which indicates whether or not the game machine 12 concerned is in a server-client state. The server-client state flag is numeric information taking the value 0 or 1. The server-client state flag takes the value 0 for the game machine 12 not in a server-client state (that is, in a client-dedicated state), and takes the value 1 for the game machine 12 in the server-client state. It should be noted that the server-client information storage unit 22 may store information specifying a server-client machine at that time. For example, identification information (game machine ID) of the game machine 12 which operates as a server-client machine at that time may be stored.

[Client Function Unit]

The client function unit 24 realizes the client function of the game machine 12. The client function unit 24 comprises an operation information acquiring unit 26, a game situation update information receiving unit 28, a first game situation information update unit 30, a display control unit 32, and a display unit 33.

[Operation Information Acquiring Unit]

The operation information acquiring unit 26 comprises an operating unit of the game machine 12. The operation information acquiring unit 26 acquires operation information corresponding to the content of an operation carried out by the player, based on an operation signal input from the operating unit.

The operation information may be information describing, for example, the content of an operation carried out by the player, which is determined based on an operation signal input from the operating unit, or information indicative of an operation signal itself input from the operation unit. Alternatively, the operation information may be information describing the content of a movement instruction directed to the player character to be controlled. The content of a movement instruction may be, for example, dribble, pass, shoot, and so forth, and determined based on an operation signal input from the operating unit. To be described later, the operation information is used as a basis in updating the game situation information stored in the game situation information storage unit 20.

The operation information acquiring unit 26 supplies the acquired operation information to the second game situation information update unit 36 of the server-client machine. That is, in the game machine 12 in the server-client state, the operation information acquiring unit 26 supplies the operation information to the second game situation information update unit 36 in its own game machine 12 (see FIG. 4), and in the game machine 12 in the client-dedicated state, the operation information acquiring unit 26 supplies the operation information to the second game situation information update unit 36 of the server-client machine via the communication network 14 (see FIG. 3).

[Game Situation Update Information Receiving Unit]

The game situation update information receiving unit 28 is realized using the microprocessor and communication interface of the game machine 12 as main components. The game situation update information receiving unit 28 is realized only when the game machine 12 is in a client-dedicated state (see FIGS. 3 and 4). The game situation update information receiving unit 28 holds the game situation update information received from the game situation update information transmitting unit 38 of the server-client machine. The game situation update information received by the game situation update information receiving unit 28 is supplied to the first game situation information update unit 30. Details of the game situation update information will be described later.

[First Game Situation Information Update Unit]

The first game situation information update unit 30 is realized using the microprocessor of the game machine 12 as a main component. The first game situation information update unit 30 as well is realized only when the game machine 12 is in a client-dedicated state (see FIGS. 3 and 4), similar to the game situation update information receiving unit 28. The first game situation information update unit 30 updates the game situation information stored in the game situation information storage unit 20, based on the game situation update information received by the game situation update information receiving unit 28.

[Display Control Unit and Display Unit]

The display control unit 32 is realized using the image processing unit of the game machine 12 as a main component. The display unit 33 is realized using the monitor of the game machine 12 as a main component. The display control unit 32 produces a game screen image based on the game situation information stored in the game situation information storage unit 20, and controls the display unit 33 so as to display the game screen image.

[Server Function Unit]

The server function unit 34 realizes the server function of the game machine 12. The server function unit 34 is realized only when the game machine 12 is in a server-client state (see FIGS. 3 and 4). The server function unit 34 comprises a second game situation information update unit 36, a game situation update information transmitting unit 38, a play evaluation value calculation unit 40, a switching determination time monitor unit 50, and a switching determination unit 52.

[Second Game Situation Information Update Unit]

The second game situation information update unit 36 is realized using the microprocessor of the game machine 12 as a main component. The second game situation information update unit 36 updates the game situation information stored in the game situation information storage unit 20, based on the operation information supplied from the operation information acquiring unit 26 of each game machine 12.

[Game Situation Update Information Transmitting Unit]

The game situation update information transmitting unit 38 is realized using the microprocessor and communication interface of the game machine 12 as main components. The game situation update information transmitting unit 38 sends, in the case where the game situation information stored in the game situation information storage unit 20 is updated by the second game situation information update unit 36, the updated content of the game situation information storage unit 20 so that the updated content is reflected in the game situation information stored in the game situation information storage unit 20 of the other game machine 12.

For example, the game situation update information transmitting unit 38 sends all or some of the game situation information stored in the game situation information storage unit 20, as game situation update information. Also, for example, the game situation update information transmitting unit 38 may send, as game situation update information, information describing the content updated by the second game situation information update unit 36.

[Play Evaluation Value Calculation Unit]

The play evaluation value calculation unit 40 calculates a play evaluation value corresponding to each of at least one of the plurality of game machines 12 during the game. In this embodiment, the play evaluation value calculation unit 40 calculates a play evaluation value corresponding to each of the plurality of game machines 12. The play evaluation value calculation unit 40 comprises a play evaluation value storage unit 42, a play type storage unit 44, a play determination unit 46, and a play evaluation value update unit 48.

[Play Evaluation Value Storage Unit]

The play evaluation value storage unit 42 is realized using the main memory of the game machine 12 as a main component. The game play evaluation value storage unit 42 stores a play evaluation value corresponding to each game machine 12, specifically, a play evaluation value table, such as is shown in FIG. 5, in this embodiment. As shown, the play evaluation value table includes a "player ID" field, a "game machine ID" field, and a "play evaluation value" field. In the "player ID" field, a player ID (identification information uniquely discriminating each player) is stored. In the "game machine ID" field, the game machine ID (identification information uniquely discriminating the game machine 12) of the game machine of the player is stored. In the "play evaluation value" field, the game evaluation values acquired by the player is accumulatively stored. It should be noted that, in the case where one player corresponds to one game machine or the like, either the "player ID" field or the "game machine ID" field may be omitted.

[Play Type Storage Unit]

The play type storage unit 44 is realized using the main memory of the game machine 12 as a main component. The play type storage unit 44 stores an evaluation value in association with a play type. The play type storage unit 44 stores a play type table such as is shown in FIG. 6, for example. As shown, the play type table includes a "play type" field and an "evaluation value" field. In the "play type" field, information identifying a play type is stored. In this embodiment, a play type corresponding to the kind of a movement (dribble, shoot, pass, and so forth, for example) carried out by a player character or a play type corresponding to a game event (for example, a foul event, a score event, a yellow card, a red card, and so forth) that occurred in response to the movement of a player character, is defined. An evaluation value to be imparted to a player who carries out a game play belonging to the defined play type is stored in the "evaluation value" field.

[Play Determination Unit]

The play determination unit 46 is realized using the microprocessor of the game machine 12 as a main component. The play determination unit 46 determines whether or not a game play belonging to any play type stored in the play type storage unit 44 is carried out by the player of each game machine 12. This determination is made based on the game situation information stored in the game situation information storage unit 20 and/or the operation information acquired by the operation information acquiring unit 26 of each game machine 12.

In this embodiment, the play determination unit 46 acquires the kind of movement made by the character to be controlled by each player, based on the game situation information stored in the game situation information storage unit 20 (or operation information acquired by the operation information acquiring unit 26 of each game machine 12). Then, the play determination unit 46 determines whether or not the kind of movement made by the character to be controlled by each player is the kind of movement corresponding to any play type stored in the play type storage unit 44. In the case where it is determined that the kind of movement made by the character to be controlled is the same as the kind of movement corresponding to any play type, the play determination unit 46 determines that a game play corresponding to the play type is carried out by the player.

Also, in this embodiment, the play determination unit 46 determines whether or not a game event corresponding to any play type stored in the play type storage unit 44 occurs due to the movement of the character to be controlled by each player. This determination also is made based on the game situation information stored in the game situation information storage unit 20 (or operation information acquired by the operation information acquiring unit 26 of each game machine 12). In the case where the game event which occurs due to the movement of the character to be controlled is a game event corresponding to any play type, the play determination unit 46 determines that a game play belonging to that play type is carried out by the player.

[Play Evaluation Value Update Unit]

The play evaluation value update unit 48 is realized using the microprocessor of the game machine 12 as a main component. The play evaluation value update unit 48 updates the content of the play evaluation value storage unit 42 based on the result of a determination made by the play determination unit 46. More specifically, in the case where it is determined that the game play carried out by the player belongs to any play type, the play evaluation value update unit 48 updates the play evaluation value stored so as to correspond to the player (the player's game machine 12), based on the evaluation value stored so as to correspond to that play type, with detail thereof to be described later (see S107 in FIG. 7).

[Switching Determination Time Monitor Unit]

The switching determination time monitor unit 50 is realized using the microprocessor and time measurement unit of the game machine 12 as main components. During a game, the switching determination time monitor unit 50 monitors whether or not a predetermined switching determination time arrives. A switching determination time repetitively arrives during a game. In this embodiment, a switching determination time is a time based on shift from an in-play state to an out-of-play state. It should be noted that an "out-of-play" refers to a state in which the ball is present beyond the goal or touch line or the judge suspends the game due to a foul, a person being injured, or the like. An "in-play" refers to a state other than an out-of-play state, in which the ball is present within the playing area, rather than beyond the goal or touch line, with the game kept in progress. Whether the game is in an in-play state or an out-of-play state is determined based on, for example, the game situation information (the position of a ball, or the like) stored in the game situation information storage unit 20.

[Server Switching Unit]

The server switching unit 52 is realized using the microprocessor of the game machine 12 as a main component. In the case where a predetermined switching determination time arrives, the server switching unit 52 switches the server-client machine from the game machine 12 currently operating as a server-client machine to another game machine 12, based on the play evaluation value calculated by the play evaluation value calculation unit 40.

For example, the server switching unit 52 may determine whether or not to switch the server-client machine from the game machine 12 currently operating as a server-client to any other game machine 12 of the plurality of game machines 12, based on the play evaluation value calculated by the play evaluation value calculation unit 40. For example, the server switching unit 52 may determine whether or not to switch the server-client machine from the game machine 12 currently operating as a server-client machine to any other game machine 12 of the plurality of game machines 12, based on the result of determination as to whether or not the play evaluation value corresponding to the game machine 12 currently operating as a server-client machine satisfies a predetermined condition.

Here, a "predetermined condition" may be whether or not the play evaluation value is smaller than a predetermined reference value. In this case, in the case where the play evaluation value corresponding to the game machine 12 operating as a server-client machine is smaller than a predetermined reference value, the server switching unit 52 determines to switch the server-client machine from the game machine 12 currently operating as a server-client to another game machine 12. It should be noted that in this case the play evaluation value storage unit 42 may calculate solely a play evaluation value corresponding to the game machine 12 currently operating as a server-client machine.

Also, a "predetermined condition" may be whether or not the play evaluation value is smaller than a play evaluation value corresponding to the game machine 12 operating as a client-dedicated machine. In this case, in the case where the play evaluation value corresponding to the game machine 12 currently operating as a server-client machine is smaller than the play evaluation value corresponding to the game machine 12 operating as a client-dedicated machine, the server switching unit 52 determines to switch the server-client machine from the game machine 12 currently operating as a server-client to another game machine 12.

Also, for example, the server switching unit 52 may select at least one of the plurality of game machines 12 based on the play evaluation value calculated by the play evaluation value calculation unit 40 so that the selected game machine 12 operates as a server-client machine.

In this embodiment, the server switching unit 52 selects one of the two game machines 12, which presents a higher play evaluation value calculated by the play evaluation value calculation unit 40, as the one operating as a server-client machine. Then, the server switching unit 52 updates the server-client information stored in the server-client information storage units 22 of the respective game machines 12, in order to cause the selected game machine 12 to operate as a server-client machine. More specifically, the server-client state flag stored in the server-client information storage unit 22 of the game machine 12 selected to be caused to operate as a server-client machine is set to 1, and the server-client state flag stored in the server-client information storage unit 22 of the other game machine 12 is set to 0.

Figure 7:
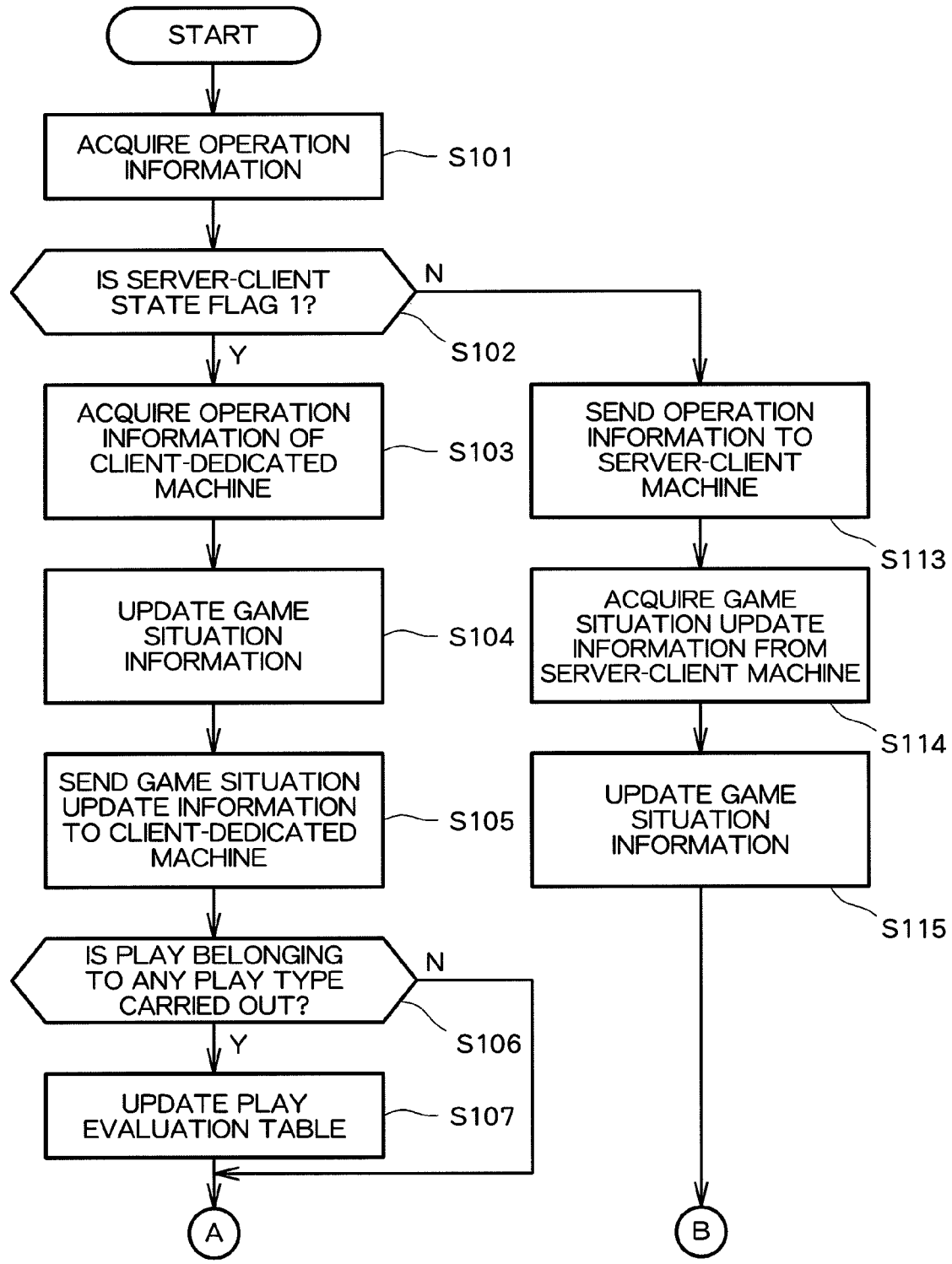
FIG. 7 is a flowchart of a process carried out in each game machine.
Figure 8:
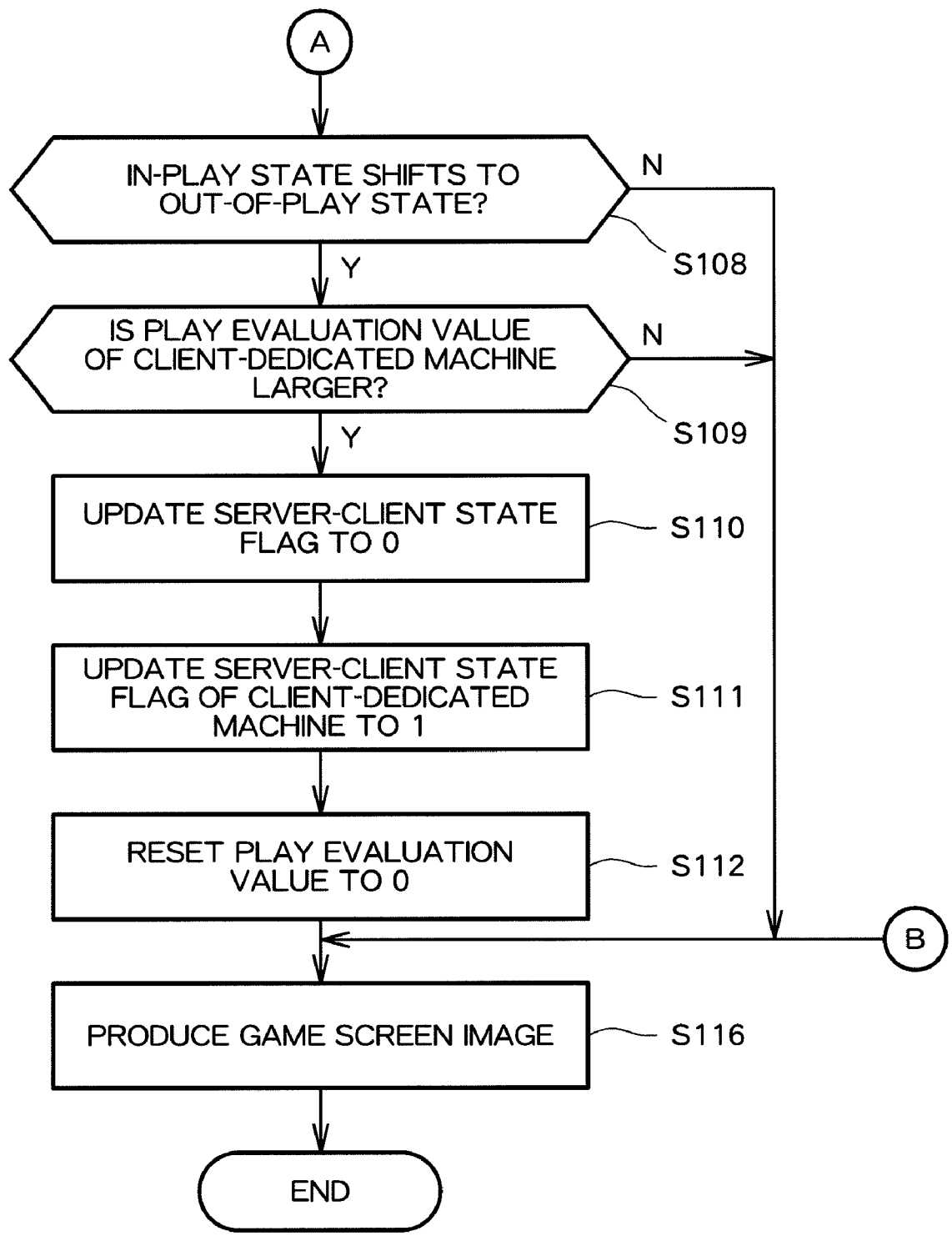
FIG. 8 is a flowchart of a process carried out in each game machine.

In the following, a process to be carried out in each game machine 12 will be described. FIGS. 7 and 8 are flowcharts mainly of a process according to the present invention among those to be carried out for every predetermined period of time (for example 1/60 seconds) in each game machine 12 during a game play. This process is carried out in each game machine 12 by carrying out a game program read from an information storage medium, such as a DVD-ROM, or the like, or provided via the communication network 14.

As shown in FIG. 7, in this process, the operation information acquiring unit 26 initially acquires operation information describing the content of an operation carried out by the player (S101). Thereafter, the game machine 12 determines whether or not the server-client state flag stored in the server-client information storage unit 22 is set at 1 (S102). In the event that it is determined that the server-client state flag is set at 1, a server-client state process is carried out (S103 to S112). On the other hand, in the case where it is determined that the server-client state flag is not set at 1, a client-dedicated state process is carried out (S113 to S115).

In the server-client state process, the second game situation information update unit 36 initially acquires the operation information sent from the operation information acquiring unit 26 of a client-dedicated machine (another game machine 12) (S103). Then, the second game situation information update unit 36 updates the game situation information stored in the game situation information storage unit 20, based on the operation information acquired at S101 and the operation information acquired at S103 (S104). Thereafter, the game situation update information transmission unit 38 sends the game situation update information describing the updated content of the game situation information at S104 to the client-dedicated machine (S105).

Thereafter, the play determination unit 46 determines whether or not a game play corresponding to any play type stored in the play type storage unit 44 is carried out by any player (S106). In the case where it is determined that a game play corresponding to any play type is carried out, the play evaluation value update unit 48 updates the play evaluation value table (S107). Specifically, the play evaluation value update unit 48 acquires an evaluation value corresponding to the play type, while referring to the play type table. Then, the play evaluation value update unit 48 adds the acquired evaluation value to the value stored in the "play evaluation value" field corresponding to the player carrying out the game play (the game machine 12 of the player carrying out the game play).

After the process in S107 or when it is determined in S106 that no game play corresponding to any play type is carried out, the switching determination time monitor unit 50 determines whether or not the in-play state shifts to an out-of-play state (S108). In the case where it is determined that the in-play state shifts to an out-of-play state, the server switching unit 52 determines, while referring to the play evaluation value table, whether or not the play evaluation value of the client-dedicated machine (another game machine 12) is larger than the play evaluation value of its own game machine 12 (S109).

In the case where it is determined that the play evaluation value of the client-dedicated machine is larger, the server switching unit 52 updates the server-client state flag stored in the server-client information storage unit 22 to 0 (S110) and the server-client state flag stored in the server-client information storage unit 22 of the client-dedicated machine (another game machine 12) to 1 (S111). Also, the play evaluation value update unit 48 updates the play evaluation value table, and resets the play evaluation value of each player (each game machine 12) to 0 (a predetermined initial value) (S112).

Meanwhile, in the client-dedicated state process, the operation information acquiring unit 26 sends the operation information acquired at S101 to the server-client machine (another game machine 12) (S113). Thereafter, the first game situation information update unit 30 acquires the game situation update information sent from the game situation update information transmission unit 38 of the server-client machine, from the game situation information update information receiving unit 28 (S114). Then, the first game situation information update unit 30 updates the game situation information stored in the game situation information storage unit 20, based on the game situation update information acquired at S114 (S115).

After the server-client state process or the client-dedicated state process is carried out, the display control unit 32 creates a game screen image in the VRAM based on the content stored in the game situation information storage unit 20 (S116). The game screen image created in the VRAM is output to the display unit 33 at a predetermined time for display.

In the above described network game system 10, the server-client machine is switched from the game machine 12 currently operating as a server-client machine to another game machine 12 at a predetermined switching determination time during the play, based on the play evaluation value corresponding to each game machine 12. Therefore, according to the network game system 10, it is possible to switch the server-client machine while considering the situation of the game, and consequently, while avoiding reduction in excitement of the game.

Also, in the network game system 10, as one of two game machines 12, which presents a higher play evaluation value calculated by the play evaluation value calculation unit 40 is selected as a server-client machine every arrival of a switching determination timing during a game, as long as a player keeps playing the game with higher evaluation than their opponent player, a situation in which the game machine 12 of that player remains operating as a server-client machine continues. That is, as the player keeps playing the game with higher evaluation than their opponent player, a situation advantageous to that player remains. This makes it possible to preferably reproduce an effect reflecting the "tide of the game" or "run" in a real sport game.

It should be noted that application of the present invention is not limited to the above-described embodiment.

For example, the server switching unit 52 may select one of two game machines 12, which presents a lower play evaluation value calculated by the play evaluation value calculation unit 40, as a server-client machine. With the above, a situation in which the game machine 12 of a player inferior in skill in playing the game to their opponent player operates as a server-client machine remains. That is, a situation advantageous to a player inferior in skill in playing the game to their opponent player continues, which can enhance the excitement of the matching game, for example.

Alternatively, a plurality of players may be made associated with one game machine 12, for example. In this case, the switching determination unit 52 handles the statistical value of the play evaluation values of the players associated with the game machine 12 as a play evaluation value corresponding to that game machine 12. For example, the average, maximum, or minimum of the play evaluation values of the players associated with the game machine 12 may be used as a play evaluation value corresponding to the game machine 12.

Application of the present invention is not limited to the network game system 10 providing a soccer game, for example. The present invention can be applied to a network game system providing any other sport game or a game of another kind (a fighting game and so forth).

The invention claimed is:

1. A network game system including a plurality of game machines each having a server function and a client function, in which each of the plurality of game machines operates as a client and at least one of the plurality of game machines also operates as a server, thereby providing a game to be played by players of the plurality of game machines, comprising:
    play evaluation value calculating means for calculating a play evaluation value corresponding to each of at least one of the plurality of game machines during the game, wherein the play evaluation value comprises a cumulative value for the players of the respective machines, and is calculated by accumulating evaluation values that are based on performance of the players on the respective machines during a duration of the game;

switching determination time monitoring means for monitoring to see whether or not a predetermined switching determination time arrives, wherein the predetermined switching determination time comprises an out-of-play state that occurs during the duration of the game; and
server switching means for switching a game machine operating as the server from a game machine currently operating as the server to another game machine of the plurality of game machines, based on the play evaluation value calculated by the play evaluation value calculating means, in the event that the switching determination time arrives.

2. The network game system according to claim 1, wherein the play evaluation value calculating means includes play evaluation value storage means for storing the play evaluation value so as to correspond to the game machine,
play type storage means for storing an evaluation value so as to correspond to one or each of a plurality of play types, and
play evaluation value update means for updating, in the case where a play corresponding to any play type is carried out by a player associated with the game machine, the play evaluation value stored in the play evaluation value storage means so as to correspond to that game machine, based on the evaluation value stored in the play type storage means so as to correspond to that play type.

3. The network game system according to claim 1, wherein the play evaluation value calculating means calculates a play evaluation value corresponding to each of the plurality of game machines, and
the server switching means switches the game machine operating as the server from the game machine currently operating as the server to a game machine presenting a highest play evaluation value calculated by the play evaluation value calculating means among the plurality of game machines.

4. A game machine included in a network game system including a plurality of game machines each having a server function and a client function, in which each of the plurality of game machines operates as a client and at least one of the plurality of game machines also operates as a server, thereby providing a game to be played by players of the plurality of game machines, comprising:
play evaluation value calculating means for calculating a play evaluation value corresponding to each of at least one of the plurality of game machines during the game, wherein the play evaluation value comprises a cumulative value for the players of the respective machines, and is calculated by accumulating evaluation values that are based on performance of the players on the respective machines during a duration of the game;
switching determination time monitoring means for monitoring to see whether or not a predetermined switching determination time arrives, wherein the predetermined switching determination time comprises an out-of-play state that occurs during the duration of the game; and
server switching means for switching a game machine operating as the server from a game machine currently operating as the server to another game machine of the plurality of game machines, based on the play evaluation value calculated by the play evaluation value calculating means, in the event that the switching determination time arrives.

5. A method for controlling a game machine included in a network game system including a plurality of game machines each having a server function and a client function, in which each of the plurality of game machines operates as a client and at least one of the plurality of game machines also operates as a server, thereby providing a game to be played by players of the plurality of game machines, comprising:
a play evaluation value calculating step of calculating a play evaluation value corresponding to each of at least one of the plurality of game machines during the game, wherein the play evaluation value comprises a cumulative value for the players of the respective machines, and is calculated by accumulating evaluation values that are based on performance of the players on the respective machines during a duration of the game;
a switching determination time monitoring step of monitoring to see whether or not a predetermined switching determination time arrives, wherein the predetermined switching determination time comprises an out-of-play state that occurs during the duration of the game; and
a server switching step of switching a game machine operating as the server from a game machine currently operating as the server to another game machine of the plurality of game machines, based on the play evaluation value calculated at the play evaluation value calculating step, in the event that the switching determination time arrives.

6. A non-transitory computer readable information storage medium recording a program for causing a computer to function as a game machine included in a network game system including a plurality of game machines each having a server function and a client function, in which each of the plurality of game machines operates as a client and at least one of the plurality of game machines also operates as a server, thereby providing a game to be played by players of the plurality of game machines, the computer functioning as:
play evaluation value calculating means for calculating a play evaluation value corresponding to each of at least one of the plurality of game machines during the game, wherein the play evaluation value comprises a cumulative value for the players of the respective machines, and is calculated by accumulating evaluation values that are based on performance of the players on the respective machines during a duration of the game;
switching determination time monitoring means for monitoring to see whether or not a predetermined switching determination time arrives, wherein the predetermined switching determination time comprises an out-of-play state that occurs during the duration of the game; and
server switching means for switching a game machine operating as the server from a game machine currently operating as the server to another game machine of the plurality of game machines, based on the play evaluation value calculated by the play evaluation value calculating means, in the event that the switching determination time arrives.

7. The network game system according to claim 2, wherein the play evaluation value calculating means calculates a play evaluation value corresponding to each of the plurality of game machines, and
the server switching means switches the game machine operating as the server from the game machine currently operating as the server to a game machine presenting a highest play evaluation value calculated by the play evaluation value calculating means among the plurality of game machines.

* * * * *